United States Patent Office 2,950,291
Patented Aug. 23, 1960

2,950,291

17-OXYGENATED ESTRA-1,3,5(10)-TRIENE-1,4-DIOLS, THEIR ESTERS, AND A CORRESPONDING QUINONE

James Jiu, Morton Grove, Ill., assignor to G. D. Searle & Co., Chicago, Ill., a corporation of Delaware No Drawing. Filed Dec. 22, 1958, Ser. No. 781,858

8 Claims. (Cl. 260—397.3)

This invention relates to 17-oxygenated estra-1,3,5(10)-triene-1,4-diols, their esters, and a corresponding quinone, as also to processes whereby these products can be manufactured. More particularly, this invention relates to compounds of the formula

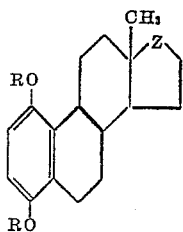

wherein Z represents a carbonyl, hydroxymethylene, or lower alkanoyloxymethylene radical, and R represents hydrogen or a lower alkanoyl radical.

The lower alkanoyl constituents referred to are groupings of the formula

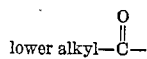

"lower alkyl" standing for methyl, ethyl, propyl, isopropyl, butyl, isobutyl, sec-butyl, tert-butyl, pentyl, isopentyl, tert-pentyl, neopentyl, hexyl, isohexyl, heptyl, or like $C_nH_{2n+1}$ monovalent aggregates wherein $n$ is a positive integer amounting to less than 9. Those skilled in the art will readily appreciate from this that when Z in the first formula above represents a lower alkanoyloxymethylene radical, the compounds comprehended are 17-esters of the steroidal alcohols depicted when Z is hydroxymethylene. Similarly, when R in the formula is a lower alkanoyl radical, the compounds comprehended are 1,4-diesters of the phenolic steroids depicted when R is hydrogen.

Manufacture of the 1,4-diesters hereof proceeds by contacting an appropriate 10-hydroxyestra-1,4-dien-3-one

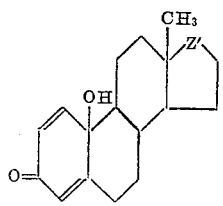

Z' being either carbonyl or hydroxymethylene, as indicated, with an appropriate alkanoic acid and its anhydride.

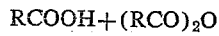

R being lower alkyl, in the presence of p-toluenesulfonic acid. Alternatively, sulfuric acid can be substituted for the p-toluenesulfonic acid and the alkanoic acid can be omitted. The desired 1,4-diesters are formed at room temperatures in the course of from a few minutes to several hours, and are cleaved to the corresponding hydroxy compounds by warming with dilute alcoholic hydrogen chloride. The resultant phenols can then be re-esterified, ad libitum, by treatment with a selected alkanoic acid and anhydride as outlined above.

The quinone of this invention

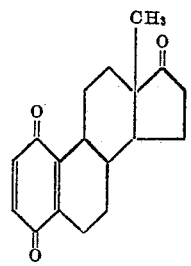

is obtained from the diol

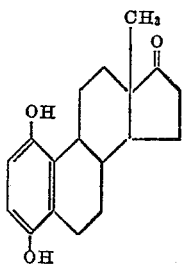

by oxidation with, for example, chromic anhydride in a liquid alkanoic acid medium. Moderate heating serves to shorten the reaction time.

The products of this invention are useful because of their valuable pharmacological properties. For example, they are estrogens, and as such characterized by a variety of associated effects, including anti-osteoporotic, anti-ovulatory, anti-progesterone, and lipid activity.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade and relative amounts of materials in parts by weight, except as otherwise noted.

Example 1

*1,4-diacetoxyestra-1,3,5(10)-trien-17-one.* — Approximately 5 parts of concentrated sulfuric acid is added to a suspension of 41 parts of 10-hydroxyestra-1,4-diene-3,17-dione (the product of Example 2 in the United States patent application of James Jiu, Serial No. 703,997, filed December 20, 1957, now Patent No. 2,910,486) in 250 parts of acetic anhydride and the resultant mixture is let stand for 2 hours with occasional agitation, temperatures being maintained in the range 20–30° throughout. The mixture is then poured into 1750 parts of water and neutralized with a saturated aqueous solution of potassium bicarbonate. The resultant mixture is extracted with ethyl acetate; and the extract is washed with water, dried over anhydrous sodium sulfate, and stripped of solvent by distillation under reduced pressures. The residue is taken up in benzene and chromatographed on silica gel, using benzene and ethyl acetate as developing solvents. There is isolated by this procedure the desired 1,4-diacetoxyestra-1,3,5(10)-trien-17-one which, recrystallized from methanol, melts at 178–182°. The product has the formula

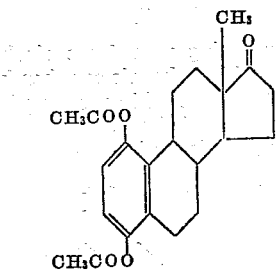

*Example 2*

1,4-dihydroxyestra-1,3,5(10)-trien-17-one.—A solution of 26 parts of 1,4-diacetoxyestra-1,3,5(10)-trien-17-one in 960 parts of methanol and 250 parts of approximately 7% hydrochloric acid is heated at the boiling point under reflux in an atmosphere of nitrogen for 2 hours, then stripped of methanol, diluted with water, and extracted with ethyl acetate. The extract is washed with water and dried over anhydrous sodium sulfate. Distillation of solvent under reduced pressures leaves a residue which, crystallized from methanol, affords 1,4-dihydroxyestra-1,3,5(10)-trien-17-one, melting in the range 296–301° (with decomposition). The product has the formula

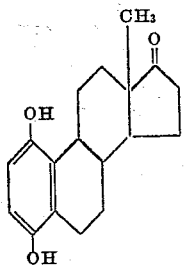

*Example 3*

1,4 - dipropionyloxyestra-1,3,5(10)-trien-17-one. — A mixture of 5 parts of 10-hydroxyestra-1,4-diene-3,17-dione, 3 parts of p-toluenesulfonic acid, 250 parts of propionic acid, and 25 parts of propionic anhydride is maintained at room temperatures for 23 hours with sufficient agitation to bring about solution (after 1 hour). Water is then added and the mixture basified with potassium bicarbonate. The mixture is then extracted with chloroform; and the chloroform extract is washed with aqueous potassium bicarbonate and then with water, dried over anhydrous sodium sulfate, and stripped of solvent by vacuum distillation. The residue is chromatographed on 200-mesh magnesia-silica gel (a material marketed under the trade name Florisil), using benzene and hexane as developing solvents. From eluates comprising 65 to 100% benzene, on evaporation of solvent, there is obtained a residue which, recrystallized from methanol, melts at 142–145°. This material is the desired 1,4-dipropionyloxyestra-1,3,5(10)-trien-17-one, of the formula

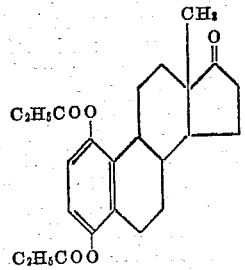

*Example 4*

Estra-2,5(10)-diene-1,4,17-trione.—To a suspension of 35 parts of 1,4-dihydroxyestra-1,3,5(10)-trien-17-one in 2000 parts of glacial acetic acid is added 16 parts of chromic anhydride. The resultant mixture is heated with agitation to incipient boiling, whereupon, after a few moments, solution occurs. The solution is filtered hot, and the filtrate is diluted with water and then extracted with benzene. The benzene extract is washed with water and dried over anhydrous sodium sulfate. Solvent is removed by vacuum distillation; and the residue is crystallized from either ethyl acetate or methanol to give estra-2,5(10)-diene-1,4,17-trione, which melts at 171–173° and has the formula

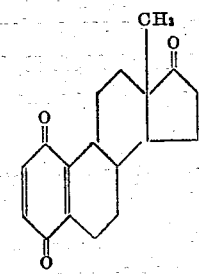

*Example 5*

A. 10,17β-dihydroxyestra-1,4-dien-3-one.—A suspension of 6 parts of 10-acetoxy-17β-hydroxyestra-1,4-dien-3-one (the product of Example 6A in United States Patent No. 2,861,086 to James Jiu) in approximately 100 parts of saturated methanolic potassium bicarbonate is heated at the boiling point under reflux for 30 minutes in an atmosphere of nitrogen. The reaction mixture is then diluted with water and extracted with chloroform. The chloroform extract is washed with water, dried over anhydrous sodium sulfate, and stripped of solvent by vacuum distillation. The residue is crystallized from ethyl acetate to give the desired 10,17β-dihydroxyestra-1,4-dien-3-one, melting at 242–245°. Chromatographic purification of the mother liquors on 200-mesh magnesia-silica gel, using benzene and ethyl acetate as developing solvents, affords a further crop of 10,17β-dihydroxyestra-1,4-dien-3-one, melting at 247–250°.

B. 1,4,17β-triacetoxyestra-1,3,5(10)-triene.—To a suspension of 57 parts of 10,17β-dihydroxyestra-1,4-dien-3-one in 300 parts of acetic anhydride is added 10 parts of concentrated sulfuric acid. Gentle agitation for a short time produces a solution which is allowed to stand at room temperatures for 2 hours. The solution is then poured onto ice and water, and the resultant mixture is extracted with chloroform. The chloroform extract is washed with water, dried over anhydrous sodium sulfate, and stripped of solvent by vacuum distillation. The residue is taken up in benzene and chromatographed on silica gel, using benzene and ethyl acetate as developing solvents. The desired 1,4,17β-triacetoxyestra-1,3,5(10)-triene thus isolated crystallizes from methanol as the hemi-methanolate, melting at 164–167°. Sans solvent of crystallization, the product has the formula

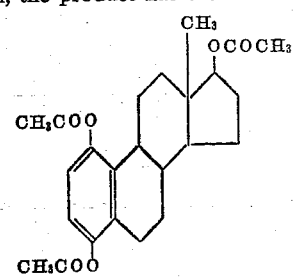

*Example 6*

Estra-1,3,5(10)-triene-1,4,17β-triol.—A solution of 9 parts of 1,4,17β-triacetoxyestra-1,3,5(10)-triene in 500 parts of methanol and 190 parts of approximately 7% hydrochloric acid is heated at the boiling point under reflux for 2 hours in an atmosphere of nitrogen. Methanol is then distilled under nitrogen and the essentially aqueous residue is extracted with ethyl acetate. The extract is washed with water and dried over anhydrous sodium sulfate. Distillation of solvent leaves as the residue the desired estra-1,3,5(10)-triene-1,4,17β-triol, which has the formula

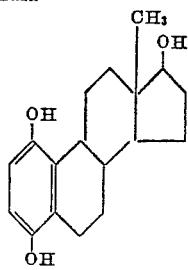

*Example 7*

*1,4,17β-tripropionyloxyestra-1,3,5(10)-triene.*—A suspension of 10 parts of estra-1,3,5(10)-triene-1,4,17β-triol and 6 parts of p-toluenesulfonic acid in 500 parts of propionic acid and 50 parts of propionic anhydride is agitated until solution occurs. The solution is allowed to stand at room temperatures for 24 hours, then diluted with aqueous potassium bicarbonate and extracted with chloroform. The chloroform extract is washed with water, dried over anhydrous sodium sulfate, and stripped of solvent by evaporation in vacuo. The residue is the desired 1,4,17β-tripropionyloxyestra-1,3,5(10)-triene, of the formula

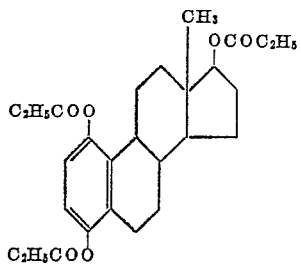

What is claimed is:
1. A compound selected from the group consisting of a compound of the formula

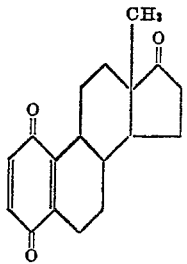

and compounds of the formula

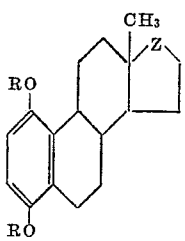

wherein Z is selected from the group consisting of carbonyl, β-hydroxymethylene, and β-(lower alkanoyloxy)-methylene radicals, and R is selected from the group consisting of hydrogen and lower alkanoyl radicals.

2. A compound of the formula

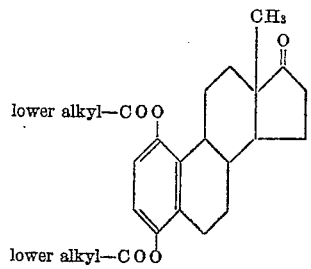

3. 1,4-diacetoxyestra-1,3,5(10)-trien-17-one.
4. 1,4-dihydroxyestra-1,3,5(10)-trien-17-one.
5. Estra-2,5(10)-diene-1,4,17-trione.
6. A compound of the formula

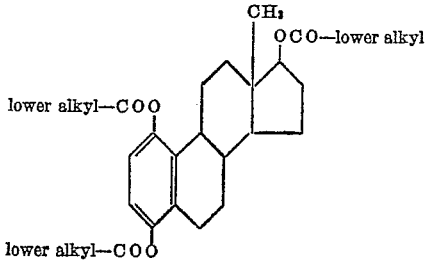

7. 1,4,17β-triacetoxyestra-1,3,5(10)-triene.
8. Estra-1,3,5(10)-triene-1,4,17β-triol.

References Cited in the file of this patent

Gold et al.: J.A.C.S., volume 80, pages 5683–87, November 5, 1958.